Figure 1:
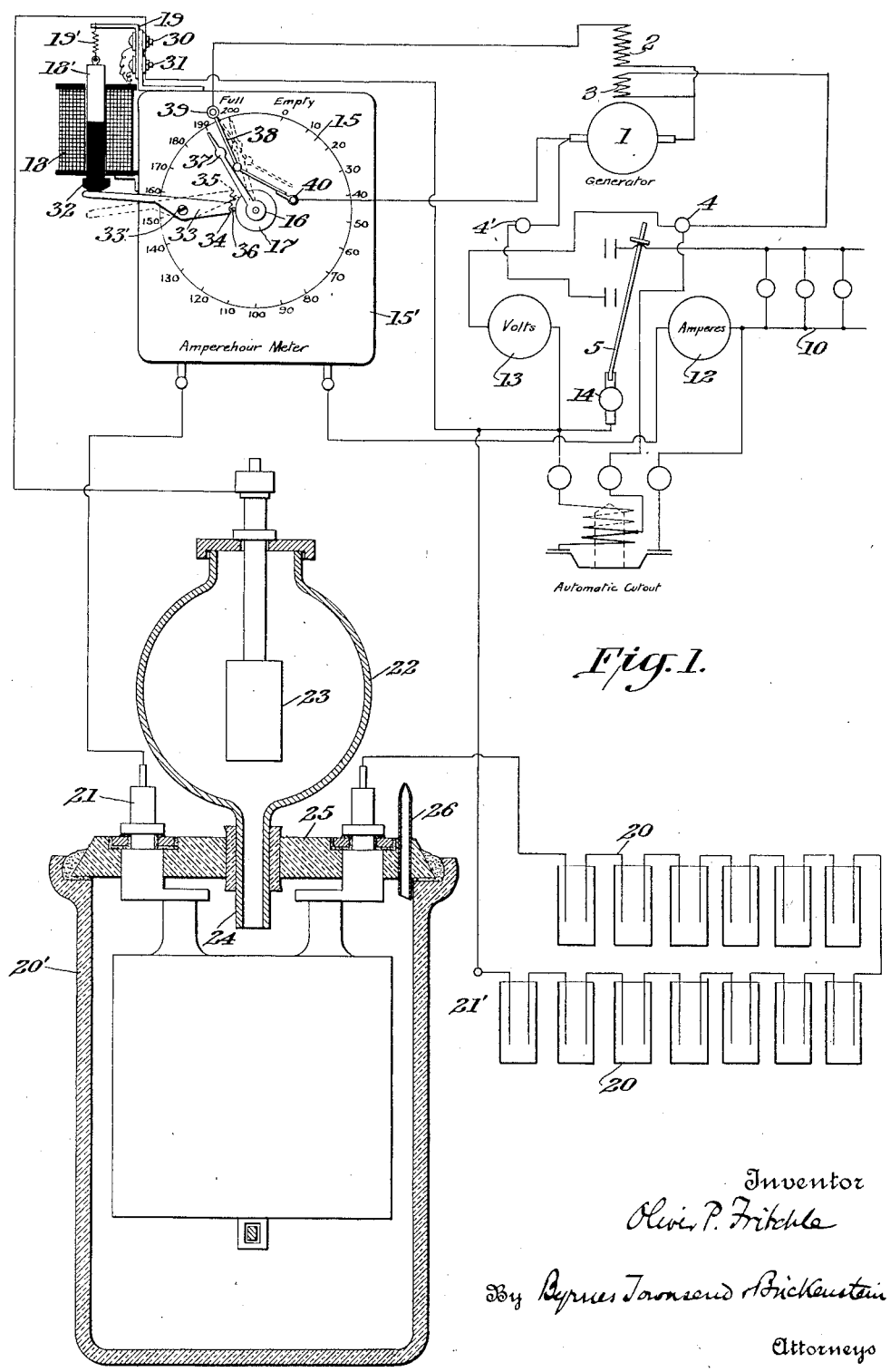

Feb. 13, 1923.
O. P. FRITCHLE.
AUTOMATIC SYSTEM OF CONTROLLING THE CHARGING OF STORAGE BATTERIES.
FILED MAR. 1, 1920.
1,445,580.
2 SHEETS—SHEET 2.
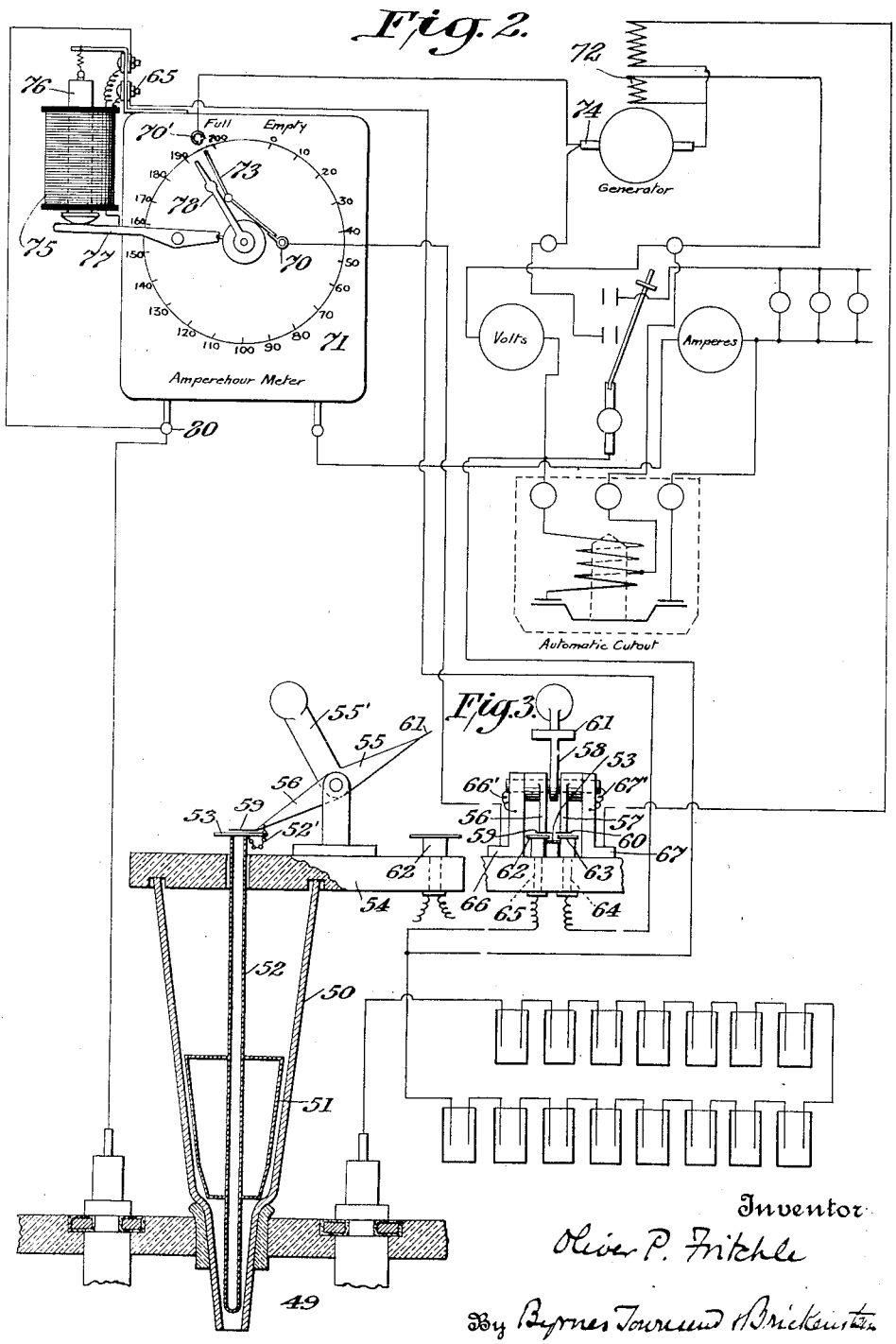

Patented Feb. 13, 1923.

1,445,580

UNITED STATES PATENT OFFICE.

OLIVER P. FRITCHLE, OF DENVER, COLORADO.

AUTOMATIC SYSTEM OF CONTROLLING THE CHARGING OF STORAGE BATTERIES.

Application filed March 1, 1920. Serial No. 362,457.

*To all whom it may concern:*

Be it known that I, OLIVER P. FRITCHLE, a citizen of the United States, residing at Denver, in the county of Denver and State of Colorado, have invented certain new and useful Improvements in Automatic Systems of Controlling the Charging of Storage Batteries, of which the following is a specification.

The present invention relates to an automatic system of controlling the charging of storage batteries. Various systems have been proposed in the past for the same purpose, but I have found that they are not sufficiently reliable or, if reliable, impracticable due to the fact that various factors enter into the practical operation which more or less alter certain conditions which are assumed to exist and on which the mode of operation of such systems is based.

For instance all devices operating on the voltage method are based on the assumption that the maximum voltage at the end of charge is definite and a constant value. If this were true, the voltage relay would be an ideal means of controlling a battery. It has been found, however, that there is a wide variation in the terminal voltage of a battery on charge due to variation in current, temperature, gravity of the electrolyte, condition of the plates, etc.

The specific gravity method of determining battery conditions is reliable, but various factors such as temperature, level of the electrolyte and the condition of the plates must be carefully taken into consideration, all incidents which are outside the scope of the ordinary attendants.

The ampere hour meter offers a most convenient and direct means of indicating the condition of a battery charge, but there are certain losses incident to storage battery operation which destroy the accuracy of the meter and introduce an error which varies from time to time. These losses are due to several different causes of local action, short circuits between plates, grounds in wiring and battery jars, etc., which cause the active material of the battery to be more or less rapidly discharged. It is therefore necessary in practice to reset from time to time the dial hand of the meter in the discharge direction so that the battery will be given an overcharge to make certain that the losses are compensated for and to thereby properly reset the meter.

Various other methods have been proposed, but to my knowledge they all contain inherent defects of like nature and are not sufficiently accurate or simple for practical purposes.

It is the principal object of the present invention to provide a system which affords at all time a correct indication of the true amount of charge in a battery.

Other objects which are secondary to this principal object will readily appear from the description of the invention.

What I consider as part of the invention will be described in detail and more particularly pointed out in the claims.

For a fuller understanding of the subject matter of the invention reference is had to the accompanying drawings in which—

Fig. 1 is a diagrammatic representation of system embodying the invention;

Fig. 2 a diagrammatic view showing a modification; and

Fig. 3 is an end view of a detail shown in Fig. 2.

Although the invention is of general application, it is particularly intended for use in connection with wind power electric plants. To this end a generator 1 is provided with a differential field consisting of a shunt winding 2 and a series winding 3 arranged to oppose each other and by their cooperation, limit, as is well understood, the voltage and current when the wind wheel runs at a very high speed. The shunt field coil furnishes about 800 ampere turns, which is a little more than sufficient for full saturation, and the reverse series coil has 20 turns, which at 20 amperes furnishes 400 ampere turns opposing the 800 ampere turns, leaving 400 ampere turns still effective. As the speed of the dynamo is increased there is no rise in the current output above the maximum of 25 amperes. The idea, of oversaturation, is to give a maximum of efficiency at low speeds and to maintain the efficiency well up to the maximum of 25 ampere current output.

A light circuit 10 representing the load and a battery 20 are connected in the usual way to the generator terminals 4 and 4'. The connection includes a switch 5 for interconnecting the negative terminal 4' of the generator, the negative terminal 21' of the battery and one terminal of the load circuit. The positive terminal 4 of the generator is connected through an automatic cut out 11 of known construction to the positive terminal 21 of the battery and the other side of the load circuit. An ammeter 12 is inserted in the circuit so as to indicate the battery charging current and the discharging current respectively and a voltmeter 13 is so connected as to indicate the voltage at the generator and battery terminals during charging and the voltage of the battery during the discharging period. A fuse 14 is inserted in the circuit to guard against a short circuit or other overload conditions.

Between the positive terminal of the generator and more particularly the ammeter 12 and the positive terminal 21 of the battery is inserted an ampere hour meter 15 to indicate the amount of charge in the battery.

The battery 20 contains, in the particular instance, sixteen cells, the cell 20' shown on an enlarged scale being used as a pilot cell. On top of this cell is a vessel or receiver 22 in which is suspended an electrode 23. The vessel 22 communicates with the interior of the cell through a neck 24 extending through the cover 25 and terminating below the level of the electrolyte. By means of suitable seals the gas evolved in the cell cannot escape to the outside except through a special vent 26 to be more particularly referred to.

To the shaft of the driving mechanism of the ampere hour meter 15 is press-fitted a tubular dial hand shaft 16 carrying a dial hand 37 and to this shaft 16 is rigidly attached a wheel 17. In this manner the dial hand may be moved independently of the gear train of the meter, but the friction is sufficient so that the gear train of the meter can operate the dial hand in either direction.

On the meter casing 15' is mounted an electromagnet comprising the solenoid 18 and the plunger 18' held on a support 19 by spring 19' tending to restrain the plunger from being drawn into the solenoid. The ends of the solenoid are connected through suitably insulated binding posts 30 and 31 with the electrode 23 and the negative terminal 21' of the battery respectively.

The plunger 18' carries at its lower end a piece 32 of fibre or other non-magnetic material projecting from the lower end of the solenoid. On the dial of the ampere hour meter 15 is pivotally mounted a lever 33 the outer end of which intercepts the reciprocating movement of the piece 32 but is not connected to the piece 32 and is free to move in either direction. The pivotal support of the lever 33 includes sufficient friction to prevent it from freely swinging. The inner end of the lever 33 carries two cogs 34 and 35 which in turn co-operate with a cog 36 on the wheel 17.

The disposition of the lever 33 is such that when it is in its full line position (Fig. 1) the cog 36 of wheel 17 will be free to pass by the lower cog 34 and bear against the cog 35. As will be more fully explained, when the cog 36 comes to bear upon the cog 35 the dial hand 37 will reach exactly the "190" mark on the dial scale and come in contact with a spring 38.

This spring 38 is in essence a switch element for opening and closing the circuit of the shunt field 2. Further movement of the dial hand 37 from the "190" mark to the "200" will cause the opening of this switch.

The operation of the system is as follows:

Assume the switch 5 to be closed and the dynamo developing a sufficiently high voltage so that the automatic cut out 11 is in closed position. The battery 20 will then be gradually charged to the full capacity. The limit will be reached when the battery is freely evolving gas. This condition is coincident with a definite position of the hand 37 over the dial of the ampere hour meter 15. In the particular instance the capacity of the battery is taken as 200 ampere hours and when the battery is fully charged, the hand 37 should indicate on the dial 200 ampere hours.

In this condition, as has been already mentioned, the battery gases freely. The only exit for the gas is by way of vent 26. This vent is designed to allow all the gas evolved in the cell to pass off so long as a certain rate of gas development is not exceeded and is principally intended as an ordinary vent for the gases normally evolved even when the battery is not being charged. As soon, however, as the charge is nearing completion, the amount of gas evolved is directly proportional to the current passing through the cell. The rate at which the gas is evolved exceeds now the rate at which it can escape through vent 26 and the electrolyte is forced by the increase of pressure, into the neck 24 and rises until it contacts with the electrode 23. As soon as this contact is made, a current will pass through the solenoid 18 which will cause the plunger to be drawn into the solenoid. It may be found desirable to provide means for adjusting the effective opening of the vent 26.

When the dial hand 37 reaches the "190" mark, it will come in contact with spring 38 and at the same time cog 36 will come to bear against cog 35, as previously mentioned and as clearly indicated in Fig. 1.

To continue its movement, the dial hand 37 would have to overcome the frictional resistance of the lever 33 and the force of the spring 38. The frictional resistance between the tubular dial hand shaft 16 and the shaft of the driving mechanism is not sufficient to overcome the combined forces opposing it and the dial hand will remain stationary over the "190" mark while the shaft of the driving mechanism continues its motion.

As soon as the battery is fully charged to its capacity of 200 ampere hours, the plunger 18' is drawn into the solenoid and the piece 32 strikes against the lever 33 forcing it about its pivot 33' to the position indicated in dotted lines in Fig. 1. At the same time the lower cog 34 engages the cog 36 and turns the wheel 17. The action of the solenoid 18 and plunger 18' is so adjusted that the dial hand is forced exactly to the "200" mark during this operation.

The spring 38 is forced out of its position thereby opening the field circuit and discontinuing the charging operation. The automatic cut out 11 at once operates to disconnect the armature of the dynamo from the battery.

The battery will now discharge causing the driving mechanism to turn the driving shaft in counter-clock wise direction.

The dial hand 37 will now return with the driving shaft to the "190" mark. It should be noted that the force of the spring 38 is not sufficient to overcome the combined forces represented by the frictional resistance of the lever 33 and the frictional resistance between the tubular shaft 16 and the shaft of the driving mechanism.

When the dial hand reaches the "190" mark, the lever 33 again reaches its full line position in Fig. 1 and will remain there while the dial hand is free to move on, the cog 36 passing the cog 34.

When the dial hand 37 has moved from the "200" mark to the "190," i. e., when 10 ampere hours are consumed, the spring 38 makes again contact with terminal 40 and thereby closes again the field circuit of the dynamo. If the voltage of the dynamo is sufficiently high, i. e., when the wind power is sufficient to produce the necessary velocity of the wind wheel, the automatic cut out will close again and connect the dynamo to the battery to resume the charging operation. This operation will again continue until the battery is fully recharged and then the gas pressure will again operate to move the dial hand from the 190 mark to the 200 mark, as it should, and again open the field circuit and so on.

In Fig. 2 is shown another means for disconnecting the dynamo from the battery.

In a vessel or receiver 50 of the pilot cell 49 is a float which may be a glass bulb 51 adapted to be floated when the electrolyte rises as before described. This float carries a stem 52 terminating in a contact plate 53 of conducting material. On a platform or base 54, preferable of hard rubber, is mounted a switch mechanism operative to open the field circuit of the dynamo and also to energize the solenoid. This switch mechanism includes a tilting beam 55 weighted above its center of gravity to be stable in either of two positions. The beam 55 comprises two arms 56 and 57 of conducting material separated by an element 58 of insulating material. The two arms 56 and 57 carry at one end contact tips 59 and 60 to normally contact with contact plate 53 while the end of the insulating element 58 carries at its end opposite the tips 59 and 60 a contact plate 61 adapted to bridge two contact plates 62 and 63 carried by posts 64 and 65 respectively. The arms 56 and 57 are conductively connected with the supports 66 and 67 respectively by coils 66' and 67', one of the supports being electrically connected to the terminal 70 on the dial of the ampere hour meter, while the other support is connected to the negative pole of the dynamo. The posts 64 and 65 are connected to the solenoid and the battery respectively.

The operation is as follows:

As long as the battery is not fully charged, the bulb 51 remains in its lower position. The beam 55 is tilted to the left (having reference to Fig. 2) and contact tips 59 and 60 rest on plate 53 whereby the field circuit is closed, the current flowing from the shunt field 72 to the terminal 70' through the spring 73 to terminal 70, then through support 66, arm 56, contact tip 59, plate 53, contact tip 60, arm 57, support 67 to the brush 74.

When the battery is fully charged the gas pressure forces the electrolyte into the vessel 50 and lifts the float 51. The stem 52 gradually raises the beam 55 until the upwardly extending weighted arm 55' passes through its vertical unstable position. When this position is reached the beam 55 will tilt to the other side and the plate 61 will come to rest upon the plates 62 and 63 upon posts 64 and 65 and thereby complete the circuit through the solenoid, the current flowing from the terminal 80 of the ampere meter 71 through the solenoid 75 to the post 64, plate 63, plate 61, plate 62, post 65 to the negative pole of the battery. The plunger 76 is actuated and the lever 77 operates to turn the dial hand 78 to the 200 mark and to open the spring switch 73 all as described in connection with Fig. 1. The evolution of gas will cease and the electrolyte will flow back into the pilot cell 49 whereupon the float 51 will drop to its lower position and tilt the beam 55 to the left by means of a link 52' as indicated in Fig. 2. In this position of the beam as shown in Fig. 2 the solenoid circuit is again open and one gap in the field circuit is closed. The second gap formed by the spring switch 73 remains open until the battery has discharged 10 ampere hours, i. e., until the dial hand 78 has returned to the 190 mark. Then the field circuit is closed again by spring switch 73 and the charging operation may be resumed.

The supports 64 and 65 and the conducting arms 56 and 57 are preferably made of acid resisting material such as hard lead and the contact plates 53, 61, 62 and 63 and the tips 59 and 60 are preferably of platinum or other suitable metal. The coils 66' and 67' may also be advantageously made of acid resisting material.

While I have described a definite arrangement and certain modifications for carrying out the objects of the invention, various changes may obviously be made within the scope of the disclosure. The duration of the periods of charging and discharging may be varied by varying the relation of the solenoid, the lever actuated by the plunger, the dial hand and the spring switch or the form of any or several of these elements, independently of or concurrently with varying the size of the vent above the pilot cell.

By properly determining the periods of charging and discharging and by limiting the charging current as by the differential field regulation I attain certain standard conditions in the battery which together with the gas evolution affords a dependable measure to indicate when the battery is correctly charged to its full capacity.

During each charging period compensation is automatically made for the losses in the battery whatever they may have been and the ampere hour meter is reset to correctly indicate the amount of charge in the battery.

I claim:

1. A system for controlling the charge of a battery including a device for indicating the balance between the amount of charge received by the battery and the amount discharged therefrom, means for indicating full charge conditions in the battery and mechanism operated from said means for automatically adjusting the said device to cause it to indicate full charge as soon as the battery is fully charged.

2. A system for controlling the charge of a battery including a device for indicating the balance between the amount of charge received by the battery and the amount discharged therefrom, said device having a dial and a dial hand, means for indicating full charge conditions in the battery and mechanism operated from said means for automatically adjusting the dial hand relatively to the dial to cause it to indicate full charge as soon as the battery is fully charged.

3. A system for controlling the charge of a battery including an ampere-hour meter for indicating the balance between the amount of charge received by the battery and the amount discharged therefrom, said meter having a dial and a dial hand adjustably connected to the driving shaft of the meter, means for indicating full charge conditions in the battery and mechanism operated from said means for automatically adjusting the dial hand relatively to the driving shaft to indicate full charge as soon as the battery is fully charged.

4. A system for controlling the charge of a battery including an ampere-hour meter for indicating the balance between the amount of charge received by the battery and the amount discharged therefrom, said meter having a dial and a dial hand adjustably connected to the driving shaft of the meter, means operative to arrest the motion of the dial hand when it reaches a predetermined position on the dial, means for indicating full charge conditions in the battery and means operated from said indicating means for automatically moving the dial hand to full charge position as soon as the battery is fully charged.

5. A system for controlling the charge of a battery including a device for indicating the balance between the amount of charge received by the battery and the amount discharged therefrom, means operative to prevent the said device from indicating full charge condition while the battery is not exactly fully charged and for causing it to indicate full charge condition as soon as the battery is exactly fully charged.

6. A system for controlling the charge of a battery including an ampere hour meter having a dial hand frictionally held on its driving shaft, means in the path of movement of the dial hand toward the full charge mark for arresting the hand and means whereby the dial hand is brought in coincidence with the full charge mark when the battery is actually fully charged.

7. A system for controlling the charge of a battery including an ampere hour meter having a dial hand frictionally held on its driving shaft, means including a lever positioned to intercept the movement of the dial hand toward the full charge mark and prevent it from reaching the mark while the battery is not fully charged and means for actuating the lever to bring the hand in coincidence with the full charge mark when the battery is actually fully charged.

8. A system for controlling the charge of a battery including an ampere hour meter having a dial hand frictionally held on its driving shaft, means including a lever positioned to intercept the movement of the dial hand toward the full charge mark and prevent it from reaching the mark while the battery is not fully charged and means for actuating the lever to bring the hand in coincidence with the full charge mark when the battery is actually fully charged, the operation of said means being a function of the rate at which gas is evolved in the battery.

9. A system for controlling the charge of a battery including an ampere hour meter having a dial hand frictionally held on its driving shaft, means including a lever positioned to intercept the movement of the dial hand toward the full charge mark and prevent it from reaching the mark while the battery is not fully charged, means for actuating the lever to bring the hand in coincidence with the full charge mark when the battery is actually fully charged and means for disconnecting the battery from the charging source when the battery is fully charged.

10. A system for controlling the charge of a battery including an ampere hour meter having a dial hand frictionally held on its driving shaft, means including a lever positioned to intercept the movement of the dial hand toward the full charge mark and prevent it from reaching the mark while the battery is not fully charged, means for actuating the lever to bring the hand in coincidence with the full charge mark when the battery is actually fully charged, a switch for controlling the charging source and means for urging the switch to closing position, said switch being opened through the agency of the lever when the latter is moved.

11. A system for controlling the charge of a battery including an ampere hour meter having a dial hand frictionally held on its driving shaft, means including a lever positioned to intercept the movement of the dial hand toward the full charge mark and prevent it from reaching the mark while the battery is not fully charged, means for actuating the lever to bring the hand in coincidence with the full charge mark when the battery is actually fully charged, a switch for controlling the charging source and means for urging the switch to closing position, said switch intercepting the path of movement of the dial hand from its arrested position to the full charge mark in such a way that it is opened by the hand and held in open position until the hand has returned to its position before it was moved by the lever.

12. A system for controlling the charge of a battery including an ampere-hour meter for indicating the balance between the amount of charge received by the battery and the amount discharged thereby, said meter having a dial and a dial hand adjustably connected to the driving shaft of the meter, means including a lever and a spring for intercepting the motion of the dial hand near the full charge mark of the dial, means for indicating full charge conditions in the battery and means operated from the said indicating means for actuating the lever to bring the dial hand in coincidence with the full charge mark as soon as the battery is fully charged.

13. Apparatus according to claim 12 in which the movement of the means operated from the indicating means is translated to operate a switch controlling the connection between the battery and the charging source.

14. Apparatus according to claim 12 in which the spring constitutes a part of a switch controlling the connection between the battery and the charging source.

15. Apparatus according to claim 12 in which the means operated from the indicating means comprises an electric circuit, a solenoid, and a plunger operatively connected with the lever.

In testimony whereof, I affix my signature.

OLIVER P. FRITCHLE.